Feb. 12, 1935.　　　C. G. BRUEMMER　　　1,990,930

GAS METER

Filed April 7, 1934

Inventor

Carl G. Bruemmer

By Murray and Gugelter
Attorneys

Patented Feb. 12, 1935

1,990,930

UNITED STATES PATENT OFFICE 1,990,930

GAS METER

Carl G. Bruemmer, Norwood, Ohio

Application April 7, 1934, Serial No. 719,530

7 Claims. (Cl. 73—1)

This invention relates to a dry meter for gas.

An object of the invention is to provide such a meter having an improved construction adapted to greatly decrease friction and wear on the meter parts and to proportionately increase the accuracy and useful life of the meter.

Another object is to provide a meter having the crank and other related structure mounted exteriorly of the valve box, rather than interiorly thereof as has been the common practice for many years, whereby corrosion of said parts by the gas is substantially precluded.

Another object is to increase the leverage exerted upon the slide valves utilized in meters of this kind whereby the meter action is greatly facilitated and the effects of sticking or gummy valves, frequently a cause of trouble heretofore, have been substantially overcome.

Another object is to provide a meter construction possessing a much greater accessibility of parts whereby repair and replacement are facilitated.

Another object is to transfer the stuffing box which has heretofore been associated with the crank interiorly of the valve box, to a position of relationship with the valve arms and in which position the stuffing box or boxes are mounted exteriorly of the valve box whereby corrosion is obviated and accessibility greatly increased.

Another object is to provide improvements of the kind indicated which may be readily incorporated in meter structures heretofore in use.

These and other objects are attained by the means described herein and illustrated in the accompanying drawing, in which.

Figure 1:
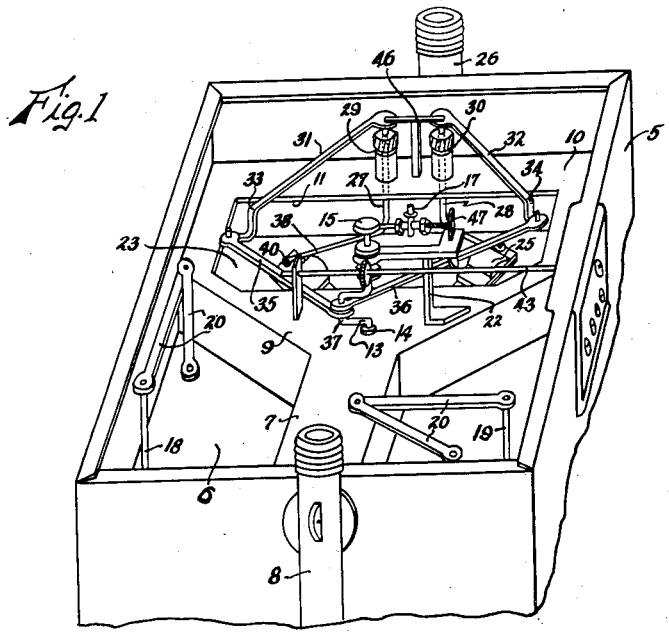
Fig. 1 is a perspective view of the top portion of the dry meter having the means of the present invention incorporated therein, the lid or the top of the meter being removed as well as the valve box cover, the flag arms being shown as dissociated from the crank for the sake of clarity.

Heretofore dry meters for gas have been constructed with the lower portion of the crank operating inside the valve box and with the valve arms associated with the crank. The crank stuffing box was likewise within the valve box and the removing of the former for repacking and of the arms for repair, adjustment or replacement entailed considerable time and skill. The proper packing of the crank stuffing box was an important factor in precluding leakage of gas and hence it was desirable to maintain the box in tightly stuffed condition. In this latter instance, however, the movement of the crank was rendered more difficult and greater frictional wear on the crank was inevitable. The consequence was that the packing remained firm for only a comparatively short time due to the continuous drag on the crank and after passing three thousand cubic feet of gas it was noted that the meter tests changed from one to five per cent. In this same connection, it was noted that after careful packing of the stuffing box, there was no leakage under one pound pressure and yet after the meter had passed three thousand cubic feet of gas, leakage at a four ounce pressure occurred. The leakage was accompanied by an accelerated action of the meter to the extent of approximately 1.2%, due to the loosening of the crank stuffing. In addition to the foregoing, various other disadvantages were apparent in the type of meter heretofore used for many years. In addition to the difficulty encountered in repacking the stuffing box, there were the comparatively swift wearing of the crank by its packing, sometimes to the extent of the crank being completely worn through; the corrosion of the lower end of the crank and the valve arms and associated parts due to their positioning in the valve box under constant exposure to gas; the reduced efficiency and operation of the meter due to sticking or gummy valves so that movement of the valves by the comparatively small leverage action operation thereon was made increasingly difficult.

The difficulty of lining up the crank due to its four bearings and the frequently noted binding of the crank due to a minute inaccuracy in so adjusting it in position whereby the meter was unable to hold its test, was another outstanding disadvantage in the older type of meter.

The foregoing and other disadvantages of long standing have been eliminated or greatly reduced by means of the present invention in which the crank is mounted on the valve box with two bearings only and wholly exteriorly thereof so that the crank and the parts directly associated therewith are removed from corrosive influence. The stuffing box has been removed from the crank to a pair of rock shafts which are associated with the valve arms and the movement of said shafts has been modified to an eighth of a turn whereas the crank, making its full turn, had a much greater drag or retarding influence operative thereon due to the stuffing box. A greatly increased leverage has been made operative upon the valves so that they are more readily moved and the retarded action due to sticking has been substantially decreased.

The transfer of various parts heretofore positioned inside the valve box to the outside thereof has greatly improved the accessibility and the improved action of the meter as a whole has made for a definitely greater accuracy in the meter indications.

Figure 2:
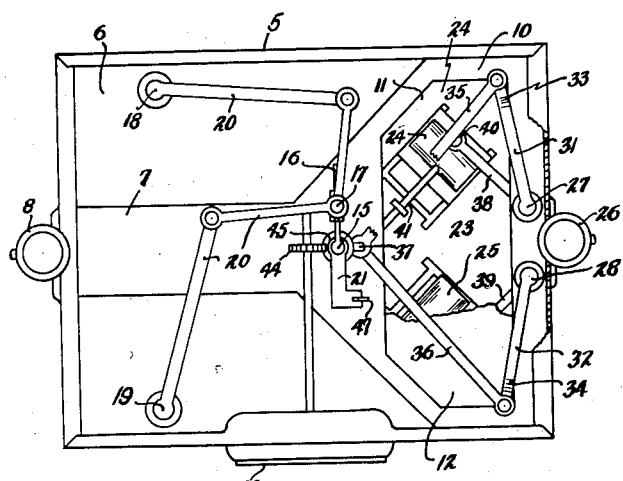
Fig. 2 is a top plan view of the device as seen in Fig. 1 but with all parts in operative position.

With reference to the drawing: The meter consists of a casing 5 of which the upper portion only has been shown, but which, in accordance with long established construction is provided in its lower part with diaphragm compartments, diaphragms, flag rods, and all associated structure which has been used heretofore and which need not be further detailed. The upper portion of the casing 5 is formed to provide the gallery 6 and within the gallery the gas inlet 7 is positioned communicating with the gas connection 8 which is adapted to be associated with a suitable supply of gas. The inner end of the gas inlet 7 is developed to form the valve box triangle 9 and the valve box 10. The latter has an enlarged transverse opening 11 which is normally closed by a suitable cover 12 (Fig. 2).

A crank 13 is vertically mounted on the valve box triangle 9, the lower end of the crank being provided with a suitable bearing 14 wholly on the outer side of the valve box. An intermediate portion of the crank has a bearing in the end of the horizontal arm 21 (Fig. 2) of the click frame 22. The upper end 15 of the crank has associated therewith a tangent 16 which comprises a connection 17 by which the crank is turned. As heretofore stated, the lower portion of the meter, not shown, has operatively positioned therein a pair of flag rods, the upper ends 18 and 19 of which project upwardly into the gallery 6. Suitable flag arms 20 extend between the connection 17 of the tangent and the extreme upper ends of the flag rods, whereby, upon axial rotation of the flag rods by the action of the diaphragms, all of which is well known, rotatory movement is transmitted to the crank. Inside the valve box, on the valve table 23, a pair of slide valves 24 and 25, of the well known kind, is positioned. These valves control the flow of gas coming in through the inlet 7 and have associated therewith the gas outlet 26, which construction is likewise well known. At the end of the valve box adjacent the outlet 26 a pair of rocking shafts 27 and 28 is mounted, one end of each rock shaft extending interiorly and the other end exteriorly of the valve box. The outer portions of shafts 27 and 28 each has a stuffing box 29 and 30 associated therewith and which is operatively joined to the shafts 27 and 28, by projecting the latter upwardly through the top of the valve box into and through the stuffing boxes. The latter are mounted on the valve box exteriorly thereof. The rock shafts may be prevented from slipping downward by a washer and cotter pin or other suitable means positioned immediately above the caps of the stuffing boxes.

The extreme upper ends of the rock shafts 27 and 28 have each fixed thereto a lever 31 and 32, respectively. Intermediate their ends, the lever 31 and 32 are bent down as at 33 and 34 so that the free ends of said levers are positioned immediately above the valve box. Said free ends of these levers are connected by links 35 and 36 with the offset portion 37 of the crank 13.

The lower ends of the rock shafts 27 and 28 are rigidly connected by valve arms 38 and 39 with the slide valves 24 and 25, respectively. It will be seen that said valve arms may in reality be integral with the rock shafts 27 and 28 and that the free ends of said arms are hingedly connected as at 40 with the outer ends of the valves 24 and 25. The opposite or inner ends of the valves have suitable guide means 41 associated therewith. In this connection, it will be seen that whereas two sets of guide means were necessarily associated with each of the valves heretofore, one of said means has been eliminated by the present invention due to the connection 40 of the valve arms 38 and 39 with the valves. The slide valves move back and forth only a very limited distance and their directions of movement, by virtue of the disposition of the valve seats, are substantially the same, within such distance, as those of the pivotally attached ends of arms 38 and 39, any arcuate movement of the valves in the arcs of said arms being negligible within the limited space of the valve strokes, during movement of the valves. It is thus that guide means at the pivotally connected ends of the valves may be eliminated.

From the foregoing description it should be apparent that the partial rotation of the flag rods 18 and 19, resulting in full rotation of the crank 13, transmits rocking movement to the rock shafts 27 and 28 whereby reciprocating movement is made operative upon the slide valves. It will further be seen that only a small rotatory movement is made by each of the rock shafts 27 and 28 so that wear upon the packing in the stuffing boxes 29 and 30 is very slight. Moreover, a much greater leverage is exerted upon the slide valves by the levers 31 and 32 and the valve arms 38 and 39 than was heretofore possible when the valve arms were directly connected to the crank. The greater leverage not only facilitates normal operation of the meter as a whole but obviates to a great extent the lessened efficiency heretofore noted when the valve seats and valves had acquired a sticky accumulation commonly experienced after periods of service of the meter. The remainder of the structure seen in the drawing is well known and need not be minutely detailed but may be mentioned as comprising the index 42, the gearing assembly associated therewith, the index axle 43 and the gear 44 and worm 45 operated by the crank in a manner well known. In addition, a click 47 cooperates with tangent 16, for precluding backward movement of the meter. It may be pointed out that it is sometimes necessary, in repairing a meter, to preclude slippage of the rock shafts 27 and 28. Accordingly, a T-shaped stay member 46 may be secured to the valve box between the stuffing boxes 29 and 30, the horizontal section of the member 46 bearing down upon the rock shaft assembly to preclude outward movement of said rock shafts when the meter might be inverted.

The improved efficiency, accessibility, and longer life of the meter of this invention have all been pointed out. Various modifications suggest themselves upon consideration of the means herein disclosed but these are believed to be comprised within the spirit and scope of the present invention.

What is claimed is:

1. In a dry meter for gas, the combination of a casing comprising a gallery, a gas inlet and valve box in the gallery, a crank mounted in the gallery, means for turning the crank, a slide valve in the valve box for controlling gas flow and having gas outlet means associated therewith, a rock shaft mounted in the gallery and having one end extending interiorly and the other end exteriorly of the valve box, a lever fixed at one end to the outer end of the rock shaft, means connecting the free end of the lever with the crank whereby rocking movement is imparted to the shaft by rotation of the crank, and a connection between the inner end of the rock shaft and the valve whereby the latter is actuated by movement of the rock shaft.

2. In a dry meter for gas, the combination of a casing comprising a gallery, a gas inlet and valve box in the gallery, a crank mounted in the gallery, means for turning the crank, a slide valve in the valve box for controlling gas flow and having gas outlet means associated therewith, a rock shaft mounted in the gallery and having one end extending interiorly and the other end exteriorly of the valve box, a lever fixed at one end to the outer end of the rock shaft, means connecting the free end of the lever with the crank whereby rocking movement is imparted to the shaft by rotation of the crank, a connection between the inner end of the rock shaft and the valve whereby the latter is actuated by movement of the rock shaft, and index means associated with and operated by the crank.

3. In a dry meter for gas, the combination of a casing comprising a gallery, a gas inlet and valve box in the gallery, a crank mounted in the gallery, means for turning the crank, a slide valve in the valve box for controlling gas flow and having gas outlet means associated therewith, a rock shaft mounted in the gallery and having one end extending interiorly and the other end exteriorly of the valve box, means associated with said shaft and crank for rocking the former upon rotation of the latter, and a connection between the inner end of the rock shaft and the valve whereby the latter is actuated by operation of the rock shaft.

4. In a dry meter for gas, the combination with a gallery, and flag rods projecting into the gallery of a gas inlet and a valve box in the gallery, a crank mounted in the gallery wholly outside the valve box, flag arms associated with the crank and the flag rods for turning the crank, a pair of slide valves in the valve box for controlling gas flow and having gas outlet means associated therewith, a pair of rock shafts mounted on the valve box and each having one end extending interiorly and the other end exteriorly of the valve box, a lever fixed at one end to the outer end of each rock shaft, a link connecting the free end of each lever with the crank whereby rocking movement is imparted to said shafts by rotation of the crank, and an arm fixed at one end to the inner end of each rock shaft and connected at the opposite end with one of said valves whereby the valves are reciprocated by movement of the rock shafts.

5. In a dry meter for gas, the combinaiton of a meter casing, a gallery in the top of the casing, a pair of flag rods, the upper ends of the rods projecting upwardly into said gallery, a gas inlet and valve box in the gallery, a crank mounted on the valve box, flag arms associated with the crank and the flag rods for turning the crank, a pair of slide valves in the valve box for controlling gas flow and having gas outlet means associated therewith, a pair of rock shafts mounted on the valve box and each having one end extending interiorly and the other end exteriorly of the valve box, a stuffing box associated with each rock shaft and positioned exteriorly of the valve box, a lever fixed at one end to the outer end of each rock shaft, a link connecting the free end of each lever with the crank whereby rocking movement is imparted to said shafts by rotation of the crank, and an arm fixed at one end to the inner end of each rock shaft and connected at the opposite end with one of said valves whereby the valves are operated by movement of the rock shafts.

6. In a dry meter for gas, the combination of a casing comprising a gallery, a gas inlet and valve box in the gallery, a crank mounted in the gallery, entirely outside of the valve box, means for turning the crank, a slide valve in the valve box for controlling gas flow and having gas outlet means associated therewith, a rock shaft mounted in the gallery and having one end extending interiorly and the other end exteriorly of the valve box, a stuffing box associated with the exterior end only of the rock shaft, means associated with said shaft and crank for rocking the former upon rotation of the latter, and a connection between the inner end of the rock shaft and the valve whereby the latter is actuated by operation of the rock shaft.

7. In a dry meter for gas, the combination of a casing comprising a gallery, a gas inlet and valve box in the gallery, a crank mounted in the gallery, means for turning the crank, a gas control valve in the valve box, a rock shaft mounted in the gallery and having one end extending interiorly and the other end exteriorly of the valve box, means associated with the outer end of the rock shaft and with the crank whereby rocking movement is imparted to the shaft by movement of the crank, and a connection between the inner end of the rock shaft and the valve whereby the latter is actuated by movement of the rock shaft.

CARL G. BRUEMMER.